United States Patent
Hong et al.

(10) Patent No.: US 9,716,273 B2
(45) Date of Patent: Jul. 25, 2017

(54) POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(71) Applicant: SAMSUNG SDI CO., LTD., Yongin-si, Gyeonggi-do (KR)

(72) Inventors: Ming-Zi Hong, Yongin-si (KR); Do-Hyung Park, Yongin-si (KR); Seon-Young Kwon, Yongin-si (KR); Joong-Ho Moon, Yongin-si (KR); Ji-Hyun Kim, Yongin-si (KR); Han-Eol Park, Yongin-si (KR); Min-Han Kim, Yongin-si (KR); Myong-A Woo, Yongin-si (KR); Ki-Hyun Kim, Yongin-si (KR); Jong-Seo Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 369 days.

(21) Appl. No.: 14/329,857

(22) Filed: Jul. 11, 2014

(65) Prior Publication Data

US 2015/0017537 A1 Jan. 15, 2015

(30) Foreign Application Priority Data

Jul. 11, 2013 (KR) ........................ 10-2013-0081829

(51) Int. Cl.
| | | |
|---|---|---|
| *H01M 4/525* | (2010.01) | |
| *C01G 53/00* | (2006.01) | |
| *H01M 4/505* | (2010.01) | |
| *C01D 15/02* | (2006.01) | |
| *H01M 4/485* | (2010.01) | |

(52) U.S. Cl.
CPC ............ *H01M 4/525* (2013.01); *C01D 15/02* (2013.01); *C01G 53/50* (2013.01); *H01M 4/485* (2013.01); *H01M 4/505* (2013.01); *C01P 2002/50* (2013.01); *C01P 2002/72* (2013.01); *C01P 2002/88* (2013.01); *C01P 2004/84* (2013.01)

(58) Field of Classification Search
CPC ...... H01M 4/525; H01M 4/505; C01G 53/50; C01D 15/02; C01P 2002/50; C01P 2002/72; C01P 2002/88; C01P 2004/84
See application file for complete search history.

(56) References Cited

U.S. PATENT DOCUMENTS

| | | | |
|---|---|---|---|
| 3,330,697 A | 7/1967 | Pechini | |
| 7,635,542 B2 * | 12/2009 | Kitao | H01M 4/131 429/206 |
| 2006/0216605 A1 * | 9/2006 | Shirakata | H01M 4/364 429/231.95 |
| 2008/0081262 A1 * | 4/2008 | Kitao | H01M 4/131 429/332 |
| 2009/0200509 A1 | 8/2009 | Suzuki et al. | |

FOREIGN PATENT DOCUMENTS

| | | |
|---|---|---|
| EP | 2 395 578 A1 | 12/2011 |
| EP | 2879209 A1 | 6/2015 |
| JP | 2010-199078 A | 9/2010 |
| JP | 2011-113792 A | 6/2011 |
| KR | 10-0734225 B1 | 7/2007 |
| KR | 10-2011-0063335 A | 6/2011 |

OTHER PUBLICATIONS

EPO Office Action dated Sep. 12, 2016, for corresponding European Patent Application No. 14174877.2 (7 pages).
EPO Search Report dated Nov. 18, 2014, for corresponding European Patent application 14174877.2, (7 pages).
Lin, Bin, et al., Preparation and electrochemical properties of $Li[Ni_{1/3}Co_{1/3}Mn_{1-x/3}Zr_{x/3}]O_2$ cathode materials for Li-ion batteries, Journal of Power Sources 174, Jun. 2007, 4 pages, 2007 Elsevier B.V.
Korean Patent Abstracts for Publication No. 10-2007-0060784 A, corresponding to KR 10-0734225 B1 (2 pages).

* cited by examiner

*Primary Examiner* — Laura Weiner
(74) *Attorney, Agent, or Firm* — Lewis Roca Rothgerber Christie LLP (57) ABSTRACT

A positive active material for a rechargeable lithium battery includes a lithium composite metal oxide represented by Chemical Formula 1. A method of preparing the positive active material includes adding a lithium metal oxide represented by Chemical Formula 2 to a Zr salt-containing solution to obtain a mixed solution, drying the mixed solution to obtain a dried product, and heat-treating the dried product to prepare a lithium composite metal oxide represented by Chemical Formula 1. A rechargeable lithium battery includes a positive electrode including the positive active material.

$Li_aZr_bNi_cCo_dM_eZr_fO_2$ [Chemical Formula 1]

where, $0.9 \leq a \leq 1.1$, $0 < b \leq 0.1$, $0 \leq c \leq 1$, $0 \leq d \leq 1$, $0 \leq e \leq 1$, $0 \leq f \leq 0.1$, $0.9 \leq a+b \leq 1.1$, $c+d+e+f=1$, and M is Mn or Al, $Li_aNi_gCo_hM_iO_2$ [Chemical Formula 2]

where, $0.9 \leq a \leq 1.1$, $0 \leq g \leq 1$, $0 \leq h \leq 1$, $0 \leq i \leq 1$, $g+h+i=1$ and M is Mn or Al.

14 Claims, 5 Drawing Sheets

POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2013-0081829 filed in the Korean Intellectual Property Office on Jul. 11, 2013, the entire contents of which are incorporated herein by reference.

BACKGROUND

1. Technical Field

A positive active material for a rechargeable lithium battery, a method of preparing the same, and a rechargeable lithium battery including the same are disclosed.

2. Description of the Related Art

Rechargeable lithium batteries have recently drawn attention as power sources for small, portable electronic devices. Rechargeable lithium batteries use organic electrolytes and thereby have two or more times the discharge voltage than a conventional battery using an alkali aqueous solution, and accordingly have high energy density.

These rechargeable lithium batteries are manufactured by injecting an electrolyte into a battery cell including a positive electrode, a negative electrode. The positive electrode includes a positive active material that can intercalate and deintercalate lithium, and the negative electrode includes a negative active material that intercalates and deintercalates lithium.

Although $LiCoO_2$ has been used as the positive active material, this material has capacity restrictions and safety concerns. Accordingly, certain substitute materials are being researched.

On the other hand, $LiCoO_2$ has stable electrochemical characteristics, $LiNiO_2$ has high-capacity, and $LiMnO_2$ has good thermal stability and is low in cost. Accordingly, Co—Ni—Mn ternary lithium metal composite oxides have been researched in an effort to combine these advantages. However, although the ternary lithium metal composite oxide has high capacity, this material also has weak thermal stability and cycle-life characteristics.

SUMMARY

According to an embodiment of the present disclosure, a positive active material for a rechargeable lithium battery has high-capacity and improved thermal safety and cycle-life characteristics.

Another embodiment provides a method of preparing the positive active material for a rechargeable lithium battery.

In yet another embodiment, a rechargeable lithium battery includes the positive active material for a rechargeable lithium battery.

According to an embodiment, a positive active material for a rechargeable lithium battery includes a lithium composite metal oxide represented by the following Chemical Formula 1.

Chemical Formula 1

In the above Chemical Formula 1, $0.9 \leq a \leq 1.1$, $0 < b \leq 0.1$, $0 \leq c \leq 1$, $0 \leq d \leq 1$, $0 \leq e \leq 1$, $0 \leq f \leq 0.1$, $0.9 \leq a+b \leq 1.1$, $c+d+e+f=1$, and M is Mn or Al.

In some embodiments, for example, the lithium composite metal oxide represented by the above Chemical Formula 1, $0.9 \leq a \leq 1.1$, $0 < b \leq 0.1$, $0 \leq c \leq 1$, $0 \leq d \leq 1$, $0 \leq e \leq 1$, $0 \leq f \leq 0.1$, $0.9 \leq a+b \leq 1.1$, $c+d+e+f=1$.

The lithium composite metal oxide may show peak at each of 2θ values of about 19° to about 23° and about 40° to about 45° in an XRD pattern using a CuKα ray.

The lithium composite metal oxide may have a Li:Zr atomic ratio of about 90:10 to about less than 100:more than 0, when Zr is present in the Li position.

According to another embodiment, a method of preparing a positive active material for a rechargeable lithium battery includes adding a lithium metal oxide represented by the following Chemical Formula 2 to a Zr salt-containing solution to obtain a mixed solution. The method further includes heat-treating the dried product to prepare the lithium composite metal oxide represented by the above Chemical Formula 1. The method further includes drying the mixed solution to obtain a dried product.

The heat-treatment may be performed at a temperature of about 350° C. to about 1000° C.

Chemical Formula 2

In the above Chemical Formula 2, $0.9 \leq a \leq 1.1$, $0 \leq g \leq 1$, $0 \leq h \leq 1$, $0 \leq i \leq 1$, $g+h+i=1$, and M is Mn or Al.

The heat-treating is performed by performing a first heat-treatment to obtain a mixture, and performing a second heat-treatment of the mixture to prepare the lithium composite metal oxide represented by the above Chemical Formula 1. The first heat-treatment may be performed at a temperature of about 80° C. to about 100° C., and the second heat-treatment may be performed at a temperature of about 350° C. to about 1000° C.

The Zr salt-containing solution may be used in an amount of about 0.1 parts by mole to about 10 parts by mole based on 100 parts by mole of the lithium metal oxide.

The Zr salt-containing solution may be an aqueous solution or an alcohol solution.

The Zr salt-containing solution may be obtained by a method that includes adding a Zr salt to a solvent to obtain a first solution, and adding citric acid to a solvent to prepare a second solution. The method further includes mixing the first solution and the second solution to obtain a transparent solution, and adding ethylene glycol to the transparent solution.

According to yet another embodiment, a rechargeable lithium battery includes a positive electrode including the positive active material, a negative electrode, and an electrolyte solution.

Other embodiments are described in the following detailed description.

According to embodiments of the present disclosure, rechargeable lithium batteries have high-capacity and improved thermal safety and cycle-life characteristics.

DETAILED DESCRIPTION

Hereinafter, embodiments of the present invention are described. However, the described embodiments are exemplary, and this disclosure is not limited to the described embodiments.

A positive active material for a rechargeable lithium battery according to one embodiment includes a lithium composite metal oxide represented by the following Chemical Formula 1.

Chemical Formula 1

In the above Chemical Formula 1, 0.9≤a≤1.1, 0<b≤0.1, 0≤c≤1, 0≤d≤1, 0≤e≤1, 0≤f≤0.1, 0.9≤a+b≤1.1, c+d+e+f=1, and M is Mn or Al.

The lithium composite metal oxide may be a compound having a structure in which zirconium (Zr) is coated on a lithium metal oxide including Li and at least one of Co, Ni, and Mn. For example, the lithium composite metal oxide may be a compound having a structure in which Zr is partially present in the position of at least Li in the lithium metal oxides.

As the Zr ion is larger than the Li ion, the coated Zr partially present in the position of at least Li facilitates the intercalation and deintercalation of Li ions, thereby improving the output characteristics and maintaining the layered structure during lithium intercalation and deintercalation, and improving thermal stability. Accordingly, the lithium composite metal oxide (in which Zr is present in the position of at least Li) may have high-capacity, and may also provide a rechargeable lithium battery having good thermal safety and cycle-life characteristics.

The Zr may be partially present in the position of at least one of Ni, Co and Mn, as well as partially present in the position of Li.

In the above Chemical Formula 1, 0.9≤a≤1.1, 0<b≤0.1, 0≤c≤1, 0≤d≤1, 0≤e≤1, 0≤f≤0.1, 0.9≤a+b≤1.1, c+d+e+f=1. For example, 0.9≤a≤1.1, 0<b≤0.05, 0≤c≤1, 0≤d≤1, 0≤e≤1, 0≤f≤0.05, 0.9≤a+b≤1.1, c+d+e+f=1. For another example, a+b+c+d+e+f=2. The lithium composite metal oxide having a composition within these ranges may have high-capacity and also may provide a rechargeable lithium battery having good thermal safety and cycle-life characteristics.

The lithium composite metal oxide represented by the above Chemical Formula 1 may show a peak at each of 2θ values of about 19° to about 23° and about 40° to about 45°, for example at each of 2θ values of about 19° to about 21° and about 40° to about 43° in an XRD pattern using a CuKα ray. When a peak at each of these 2θ values exists, the presence of a compound phase of lithium metal oxide in which Zr is present in the position of Li is confirmed. When the lithium composite metal oxide having Zr in the position of Li is used as a positive active material, a rechargeable lithium battery having high-capacity and good thermal safety and cycle-life characteristics may be obtained.

The lithium composite metal oxide may have a Li:Zr atomic ratio of about 90:10 to less than 100:more than 0, for example 90:10 to about 99.9:0.1, another example, about 90:10 to about 99:1, still another example about 95:5 to about 99:1 when Zr is present in the Li position. When the atomic ratio of Li to Zr is within either of these ranges, a rechargeable lithium battery having high-capacity and good thermal safety and cycle-life characteristics may be obtained.

The lithium composite metal oxide may be prepared according to either of the following two methods. The first method includes adding a lithium metal oxide represented by the following Chemical Formula 2 to a Zr salt-containing solution to obtain a mixed solution. The method further includes drying the mixed solution to obtain a dried product, and heat-treating the dried product to prepare the lithium composite metal oxide represented by Chemical Formula 1 (described above). The obtained lithium composite metal oxide may have a structure in which the lithium metal oxide represented by the following Chemical Formula 2 is coated with Zr. For example, the lithium composite metal oxide may have a structure in which Zr is partially present in the position of at least Li in the lithium metal oxides.

The Zr salt-containing solution may be obtained by dissolving a Zr salt in a solvent. The solvent may be water or an alcohol. In other words, the Zr salt-containing solution may be an aqueous solution or an alcohol solution. The alcohol may be, for example, a C1 to C5 alcohol.

Chemical Formula 2

In the above Chemical Formula 2, 0.9≤a≤1.1, 0≤g≤1, 0≤h≤1, 0≤i≤1, g+h+i=1, and M is Mn or Al.

According to the second method, the lithium composite metal oxide may be prepared using a sol-gel method. The second method includes adding a lithium metal oxide represented by the above Chemical Formula 2 to a Zr salt-containing solution, followed by a first heat-treatment to obtain a mixture. The method further includes performing a second heat-treatment on the mixture to prepare the lithium composite metal oxide represented by the above Chemical Formula 1.

The Zr salt-containing solution may be obtained according to the sol-gel method as follows. First, a Zr salt is added to a solvent in amount sufficient to coat, and is mixed at a room temperature to provide a first solution. Additionally, citric acid is added to a solvent in a molar amount of 0.5 times to 5 times the number of moles of the Zr salt, and is mixed at room temperature to provide a second solution. The first solution and the second solution are mixed for 10 minutes to 30 minutes to provide a transparent solution. Ethylene glycol is added to the transparent solution in a molar amount of 0.5 times to 5 times the number of moles of the Zr salt and mixed for 10 minutes to 30 minutes to provide a Zr salt-containing solution. The solvent may be water or alcohol. The alcohol may be, for example, a C1 to C5 alcohol.

The first heat-treatment may be performed at a temperature of about 80° C. to about 100° C., for example, at a temperature of about 80° C. to about 90° C. When the mixture is heat treated within either of these temperature ranges, the Zr may be uniformly coated, and water or alcohol may be simultaneously evaporated and the transparent solution is dried.

In the first method and second method, the Zr salt-containing solution may be used in an amount of about 0.1 parts by mole to about 10 parts by mole, for example about 0.1 parts by mole to about 5 parts by mole, based on 100 parts by mole of the lithium metal oxide. When the Zr salt-containing solution is used within either of these ranges, the Zr may be present in the position of Li in an appropriate amount so that a rechargeable lithium battery having high capacity and good thermal safety and cycle-life characteristics may be achieved.

The heat-treatment in the first method and the second heat-treatment in the second method may be performed at a temperature of about 350° C. to about 1000° C., for example about 600° C. to about 800° C. In addition, the heat-treatment may be performed for about 5 hours to about 10 hours, and may be performed under an air or oxygen atmosphere. When the heat-treatment is performed within either of these temperature ranges, a lithium composite metal oxide in which Zr is present in the position of Li may be provided, and a rechargeable lithium battery having high-capacity and good thermal safety and cycle-life characteristics may therefore be achieved.

Figure 1:
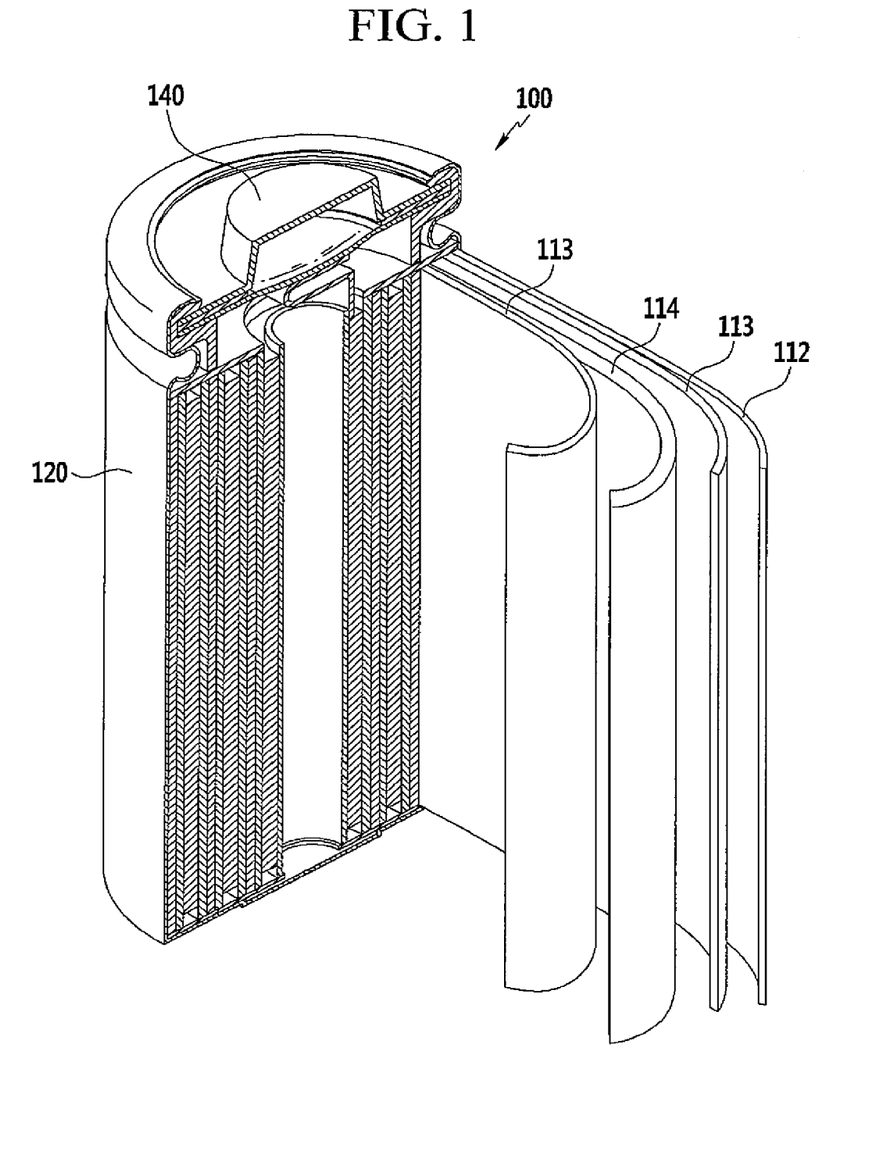
FIG. 1 is a schematic, cross-sectional perspective view of a rechargeable lithium battery according to one embodiment.

Hereafter, a rechargeable lithium battery including the positive active material is described with reference to FIG. 1. FIG. 1 is a schematic, cross-sectional perspective view of a rechargeable lithium battery according to one embodiment. Referring to FIG. 1, the rechargeable lithium battery 100 includes an electrode assembly including a positive electrode 114, a negative electrode 112 facing the positive electrode 114, a separator 113 between the positive electrode 114 and negative electrode 112, and an electrolyte (not shown) impregnating the positive electrode 114, negative electrode 112, and separator 113. The battery 100 also includes a battery case 20 housing the electrode assembly, and a sealing member 140 sealing the battery case.

The positive electrode 114 may include a current collector and a positive active material layer on the current collector. The positive active material layer may include a positive active material, a binder, and optionally, a conductive material.

The current collector may be Al but is not limited thereto.

The positive active material may be the above-described lithium composite metal oxide. When the lithium composite metal oxide is used as the positive active material, it may enhance electrical conductivity, suppress oxygen gas generation during charge and discharge, suppress the reaction with the electrolyte solution, and improve the thermal stability to thereby achieve a rechargeable lithium battery having good performance.

The binder improves the binding properties of the positive active material particles to each other and to the current collector. Nonlimiting examples of the binder include polyvinyl alcohol, carboxymethyl cellulose, hydroxypropyl cellulose, diacetyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material improves the conductivity of the electrode. Any electrically conductive material may be used as the conductive material, so long as it does not cause a chemical change. Nonlimiting examples of the conductive material include natural graphite, artificial graphite, carbon black, acetylene black, ketjen black, carbon fibers, metal powders or metal fibers of copper, nickel, aluminum, silver, and the like, and conductive materials such as polyphenylene derivatives and the like. A single conductive material may be used, or a combination of two or more conductive materials may be used.

The negative electrode 112 includes a negative current collector and a negative active material layer on the current collector. The negative current collector may include a copper foil. The negative active material layer may include a negative active material, a binder, and optionally a conductive material.

The negative active material may include a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may be a carbon material, and may be any carbon-based negative active material conventionally used in rechargeable lithium batteries. Nonlimiting examples of suitable carbon-based materials include crystalline carbon, amorphous carbon, and mixtures thereof. The crystalline carbon may be non-shaped, or sheet, flake, spherical, or fiber shaped natural graphite or artificial graphite. The amorphous carbon may be soft carbon, hard carbon, mesophase pitch carbonized products, fired coke, or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, or Sn.

The material capable of doping and dedoping lithium may be Si, $SiO_x$ ($0<x<2$), a Si—C composite, a Si-Q alloy (where Q is an alkali metal, an alkaline-earth metal, a Group 13 to 16 element, a transition metal, a rare earth element, or a combination thereof, but Q is not Si), Sn, $SnO_2$, a Sn—C composite, a Sn—R alloy (where R is an alkali metal, an alkaline-earth metal, a Group 13 to 16 element, a transition metal, a rare earth element, or a combination thereof, but R is not Sn), or the like. At least one of these materials may be mixed with $SiO_2$. Nonlimiting examples of Q and/or R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combinations thereof.

The transition metal oxide may be vanadium oxide, lithium vanadium oxide, or the like.

The binder improves the binding properties of the negative active material particles to each other and to the current collector. Nonlimiting examples of the binder include polyvinyl alcohol, carboxymethyl cellulose, hydroxypropyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material improves the conductivity of the electrode. Any electrically conductive material may be used as the conductive material, so long as it does not cause a chemical change. Nonlimiting examples of the conductive material include carbon-based materials such as natural graphite, artificial graphite, carbon black, acetylene black, ketjen black, carbon fibers and the like; metal-based materials such as metal powders or metal fibers and the like of copper, nickel, aluminum, silver, and the like; conductive polymers such as polyphenylene derivatives and the like; and mixtures thereof.

Each of the negative and positive electrodes 112 and 114 may be manufactured by a method that includes mixing the active material, the conductive material, and the binder in a solvent to prepare an active material composition, and coating the active material composition on the current collector. The electrode manufacturing method is understood by those of ordinary skill in the art. The solvent may include N-methylpyrrolidone or the like, but is not limited thereto.

The electrolyte solution includes a non-aqueous organic solvent and a lithium salt. The non-aqueous organic solvent serves as a medium for transmitting the ions taking part in the electrochemical reactions of the battery. The non-aqueous organic solvent may be, for example, a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

When the carbonate based solvent includes a mixture of linear carbonate compounds and cyclic carbonate compounds, the organic solvent may have a high dielectric constant and low viscosity. The cyclic carbonate and the linear carbonate may be mixed together in a volume ratio of about 1:1 to about 1:9.

The ester-based solvent may include, for example, n-methylacetate, n-ethylacetate, n-propylacetate, dimethylacetate, methylpropionate, ethylpropionate, γ-butyrolactone, decanolide, valerolactone, mevalonolactone, caprolactone, or the like.

The ether-based solvent may include, for example, dibutylether, tetraglyme, diglyme, dimethoxyethane, 2-methyltetrahydrofuran, tetrahydrofuran, or the like.

The ketone-based solvent may include cyclohexanone, or the like.

The alcohol-based solvent may include, for example, ethyl alcohol, isopropyl alcohol, or the like.

A single non-aqueous organic solvent may be used, or a mixture of solvents may be used. When the organic solvent is a mixture of solvents, the mixture ratio may be adjusted according to the desired battery performance.

The non-aqueous electrolyte may further include an overcharge inhibition additive, such as, for example, ethylenecarbonate, pyrocarbonate, or the like.

The lithium salt is dissolved in the organic solvent, and supplies the lithium ions in the battery, facilitates the basic operation of the rechargeable lithium battery, and improves lithium ion transportation between the positive and negative electrodes.

The lithium salt may be a supporting electrolytic salt, such as, for example, include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, e.g. an integer of 1 to 20), LiCl, LiI, $LiB(C_2O_4)_2$ (lithium bis(oxalato) borate (LiBOB)), or a combination thereof.

The lithium salt may be used in a concentration of about 0.1 M to about 2.0M. When the lithium salt is included within this concentration range, the electrolyte may have improved performance and lithium ion mobility due to optimal electrolyte conductivity and viscosity.

The separator 113 may include any material commonly used in conventional lithium batteries so long as it separates the negative electrode 112 from the positive electrode 114 and provides a passage for the transportation of lithium ions. For example, the separator 113 may be a material having low resistance to ion transportation and improved electrolyte impregnation properties. For example, the material may be selected from glass fibers, polyester, TEFLON (tetrafluoroethylene), polyethylene, polypropylene, polytetrafluoroethylene (PTFE), and combinations thereof. The separator may be a non-woven fabric or a woven fabric. For example, a polyolefin-based polymer separator such as polyethylene, polypropylene or the like may be used for a lithium ion battery. In order to ensure heat resistance or mechanical strength, a coated separator including a ceramic component or a polymer material may be used. Optionally, the separator may have a mono-layered or multi-layered structure.

Hereinafter, embodiments of the present disclosure are described with reference to certain examples. However, the examples are presented for illustrative purposes only and do not limit the scope of the present disclosure. Furthermore, what is not described in this disclosure may be sufficiently understood by those of ordinary skill in the art.

Preparation of Positive Active Material

Example 1

$NiSO_4$, $CoSO_4$ and $MnSO_4$ aqueous solutions each having a concentration of about 2.4M were mixed at a mole ratio of 56:22:22 and added to about 7.5M of a NaOH aqueous solution and about 15M of a $NH_4OH$ aqueous solution, and the mixture was continuously mixed in a co-precipitating device. The mixture was co-precipitated at a pH of 11 for a reaction time of 8 hours at a reaction temperature of 40° C. and a reaction speed of about 700 rpm to provide a $(Ni_{0.56}Co_{0.22}Mn_{0.22})(OH)_2$ precursor. The precursor was washed and dried in an oven at 120° C. and sieved. Then, the precursor and $Li_2CO_3$ were mixed using a simple mixer at a mole ratio of about 1:1. The obtained mixture was introduced into a furnace and fired at a temperature of 890° C. at a speed of 2° C./minute for about 30 hours to provide a lithium metal oxide of $Ni_{0.56}Co_{0.22}Mn_{0.22}O_2$.

1 mole of $ZrO(NO_3)_2 \cdot xH_2O$ was added into distilled water and mixed at room temperature to provide a first solution. Citric acid corresponding to an amount of two times the number of mole of $ZrO(NO_3)_2 \cdot xH_2O$ was added to distilled water and mixed at room temperature to provide a second solution. The first solution and the second solution were mixed for 20 minutes to provide a transparent solution. Ethylene glycol having the same number of moles as the moles of $ZrO(NO_3)_2 \cdot xH_2O$ was added to the transparent solution and the mixture was mixed for 20 minutes to provide a Zr salt-containing solution.

100 parts by mole of the obtained lithium metal oxide was added into the Zr salt-containing solution (containing 1 part by mole of Zr salt) and the mixture was mixed at a temperature of 80° C. until the water was completely evaporated. The mixture was heated under an air atmosphere at 700° C. for 10 hours to provide a $Li_{1.021}Zr_{0.0018}Ni_{0.56-c}Co_{0.22-d}Mn_{0.22-e}Zr_{0.0039}O_2$ (c'+d'+e'=0.0039, c'=0.0006; d'=0.0021; e'=0.0012) lithium composite metal oxide.

Example 2

A $Li_{0.991}Zr_{0.0036}Ni_{0.56-c}Co_{0.22-d}Mn_{0.22-e}Zr_{0.0027}O_2$ (c'+d'+e'=0.0027, c'=0.0004; d'=0.0015, e'=0.0008) lithium composite metal oxide was fabricated as in Example 1, except that 100 parts by mole of lithium metal oxide was added to the Zr salt-containing solution containing 5 parts by mole of Zr salt.

Example 3

A $Li_{1.043}Zr_{0.0016}Ni_{0.56-c}Co_{0.22-d}Mn_{0.22-e}Zr_{0.059}O_2$ (c'+d'+e'=0.0059, c'=0.0009; d'=0.0032; e'=0.0018) lithium composite metal oxide was fabricated as in Example 1, except that citric acid was added to ethanol to provide a second solution.

Example 4

A $Li_{1.001}Zr_{0.0034}Ni_{0.56-c'}Co_{0.22-d'}Mn_{0.22-d'}Zr_{0.0035}O_2$ (c'+d'+e'=0.0035, c'=0.0005; d'=0.0019; e'=0.0011) lithium composite metal oxide was fabricated as in Example 2, except that citric acid was added to ethanol to provide a second solution.

Comparative Example 1

$NiSO_4$, $CoSO_4$ and $MnSO_4$ aqueous solutions each having a concentration of about 2.4M were mixed at a mole ratio of 56:22:22, added to 0.02M of a $ZrO(NO_3)_2 \cdot xH_2O$ aqueous solution, and added to about 7.5M of a NaOH aqueous solution and about 15M of a $NH_4OH$ aqueous solution, and the mixture was continuously mixed in a co-precipitating device. The mixture was co-precipitated at a pH of 11 for 8 hours at a reaction temperature of 40° C. and a reaction speed of about 700 rpm to provide a $(Ni_{0.56-a}Co_{0.22-b}Mn_{0.22-c}Zr_{0.05})(OH)_2$ (wherein a+b+c=0.05) precursor. The precursor was washed and dried in an oven at 120° C., sieved and the resulting precursor and $Li_2CO_3$ were mixed using a simple mixer in order to obtain a mole ratio of about 1:1. The obtained mixture was placed in a furnace and fired at a speed of 2° C./minute at temperature of 890° C. for about 30 hours to provide a $LiNi_{0.56-c'}Co_{0.22-d'}Mn_{0.22-e'}Zr_{0.05}O_2$ (c'+d'+e'=0.05, c'-0.002, d'=0.036, e'=0.012) lithium composite metal oxide.

Comparative Example 2

$NiSO_4$, $CoSO_4$ and $MnSO_4$ aqueous solutions each having a concentration of about 2.4M were mixed at a mole ratio of 56:22:22, added to about 7.5M of a NaOH aqueous solution and about 15M of a $NH_4OH$ aqueous solution, and continuously mixed in a co-precipitating device. The mixture was co-precipitated at a pH of 11 for 8 hours at a reaction temperature of 40° C. and a reaction speed of about 700 rpm to provide a $(Ni_{0.56}Co_{0.22}Mn_{0.22})(OH)_2$ precursor. The precursor was washed and dried in an oven at 120° C., sieved, and the resulting precursor and $Li_2CO_3$ were mixed using a simple mixer in order to obtain a mole ratio of about 1:1. The obtained mixture was placed in a furnace and fired at a speed of 2° C./minute at temperature of 890° C. for about 30 hours to provide a $LiNi_{0.56}Co_{0.22}Mn_{0.22}O_2$ lithium composite metal oxide.

Evaluation 1: Evaluation of X-Ray Diffraction (XRD) of the Positive Active Materials X-ray diffraction analysis was performed on the positive active materials prepared according to Examples 1 to 4 and Comparative Example 1, and the results are shown in FIG. 2 and FIG. 3.

Figure 2:
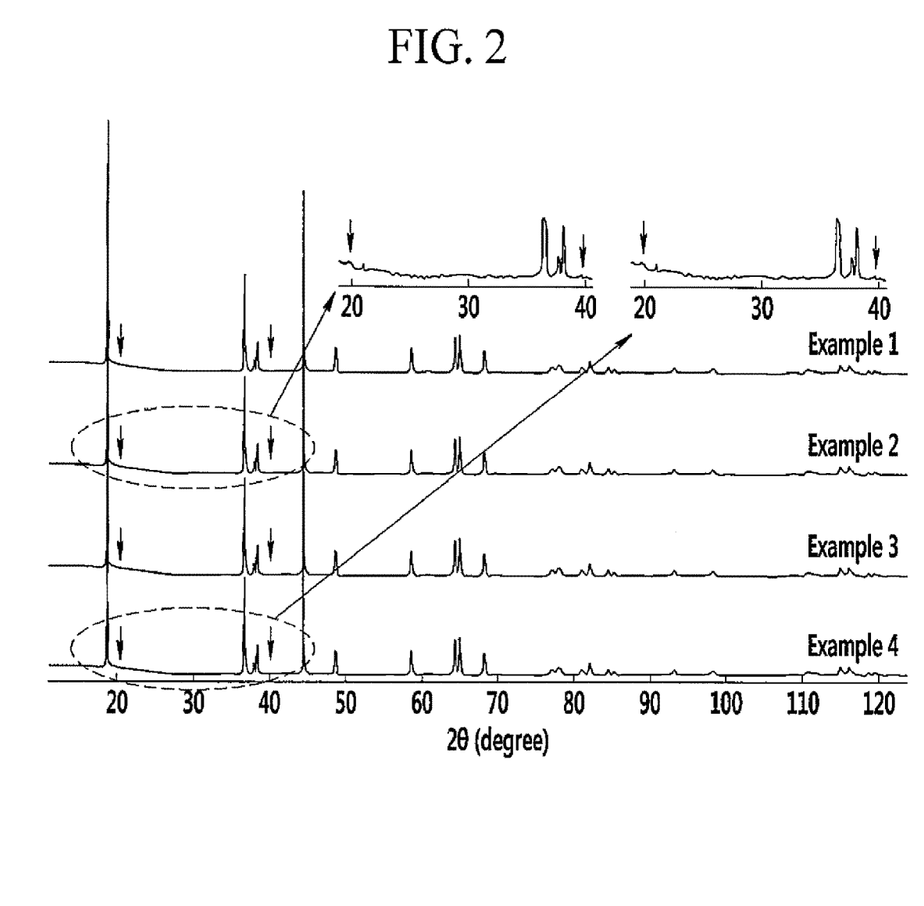
FIG. 2 is a graph comparing the X-ray diffraction analysis (XRD) of the positive active materials prepared according to Examples 1 to 4.
Figure 3:
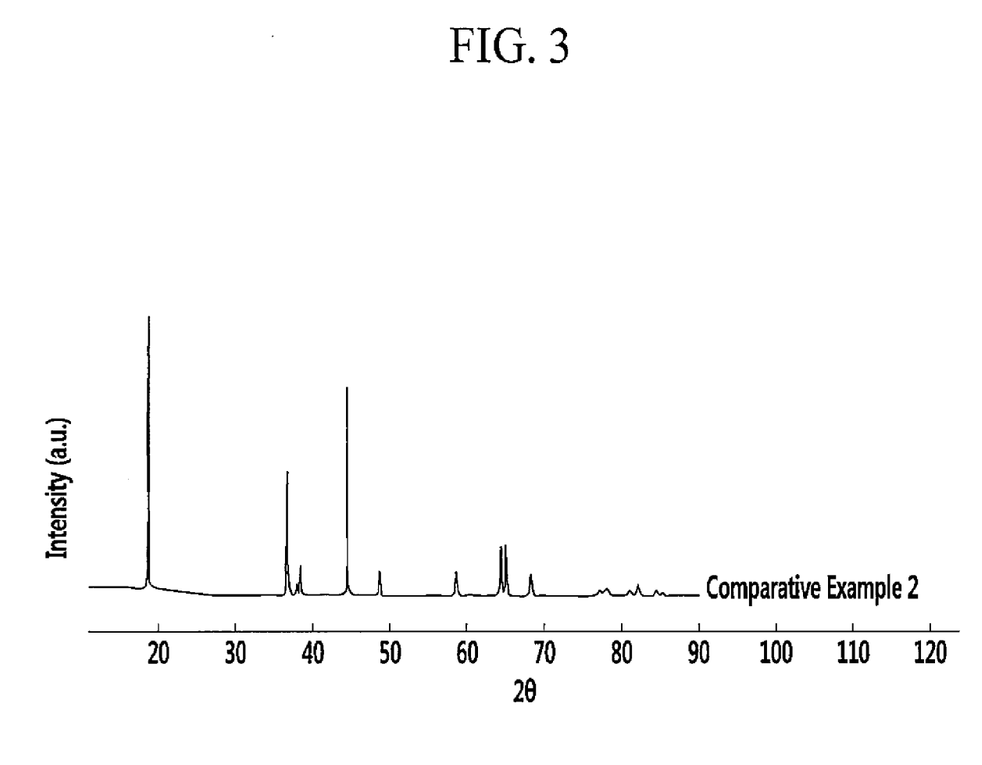
FIG. 3 is a graph of the X-ray diffraction analysis (XRD) of the positive active material prepared according to Comparative Example 1.

FIG. 2 is a graph of the X-ray diffraction analyses (XRD) of the positive active materials prepared according to Examples 1 to 4, and FIG. 3 is a graph of the X-ray diffraction analysis (XRD) of the positive active material according to Comparative Example 1.

Referring to FIG. 2, it is confirmed that Examples 1 to 4 had a structure in which Zr was coated in the position of Li. In Examples 2 and 4, the main peaks of $Li_2ZrO_3$ were shown at a 2θ value of 19° to 23° and at a 2θ value of 40° to 45°, respectively. As Examples 1 and 3 had relatively low coating amounts of Zr compared to Examples 2 and 4, the content of $Li_2ZrO_3$ is low, so the peak thereof was not shown in the XRD graph.

Referring to FIG. 3, in Comparative Example 1 (in which Zr was not coated in the position of Li, but coated only in the metal position of Ni—Co—Mn), the main peak of $Li_2ZrO_3$ was not found at a 2θ value of 19° to 23° and at a 2θ value of 40° to 45°.

In addition, the following Table 1 shows the atomic ratio of Li and Zr when Zr is present in the position of Li, which ratios were taken from the XRD results using a Rietveld refinement method.

TABLE 1

|  | Example 1 | Example 2 | Example 3 | Example 4 | Comparative Example 1 | Comparative Example 2 |
|---|---|---|---|---|---|---|
| Li:Zr atomic ratio | 99.82:0.18 | 99.64:0.36 | 99.8:0.2 | 99.67:0.33 | 100:0 | 100:0 |

Evaluation 2: Measuring Differential Scanning Calorimetry (DSC) of the Positive Active Material The positive active materials prepared according to Example 1 and Comparative Examples 1 and 2 were subjected to differential scanning calorimetry (DSC), and the results are shown in FIG. 4.

Figure 4:
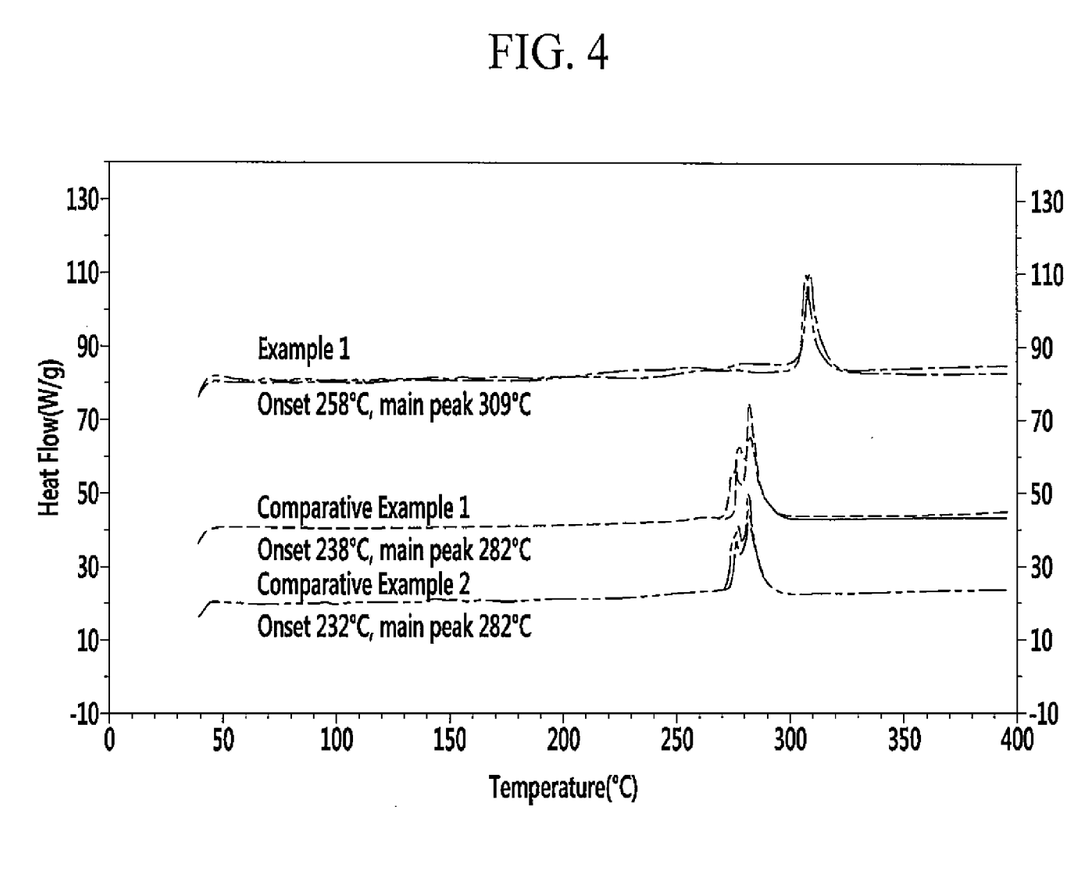
FIG. 4 is a graph comparing the DSC (differential scanning calorimetry) results of the positive active materials prepared according to Example 1 and Comparative Examples 1 and 2.

FIG. 4 is a graph comparing the DSC results of the positive active materials prepared according to Example 1 and Comparative Examples 1 and 2.

Referring to FIG. 4, it is confirmed that in Example 1 (including a positive active material including a lithium composite metal oxide in which Zr was present in the position of Li) the main exothermal peak was shifted to the higher temperature side, thereby remarkably improving thermal stability as compared to Comparative Example 1 (in which Zr was not coated in the position of Li, but coated only in the metal position of Ni—Co—Mn) and Comparative Example 2 (in which Zr was not coated).

Manufacture of Rechargeable Lithium Battery Cells 92 wt % of each positive active material obtained from Examples 1 to 4 and Comparative Examples 1 and 2, 4 wt % of polyvinylidene fluoride (PVDF), and 4 wt % of acetylene black were mixed and dispersed in N-methyl-2-pyrrolidone to provide a positive active material slurry. Then, the positive active material slurry was coated on an aluminum foil having a thickness of 10 μm, dried at 135° C. for greater than or equal to 3 hours, and compressed to provide a positive electrode.

Metallic lithium was used as a counter electrode to the positive electrode to provide a coin-type half-cell. The electrolyte solution was prepared by dissolving 1.3 M of $LiPF_6$ in a mixed solvent of ethylene carbonate (EC), ethylmethyl carbonate (EMC), and dimethyl carbonate (DMC) (EC:EMC:DMC=3:4:3 volume ratio).

Evaluation 3: Evaluation of Cycle-Life Characteristics of the Cells

Figure 5:
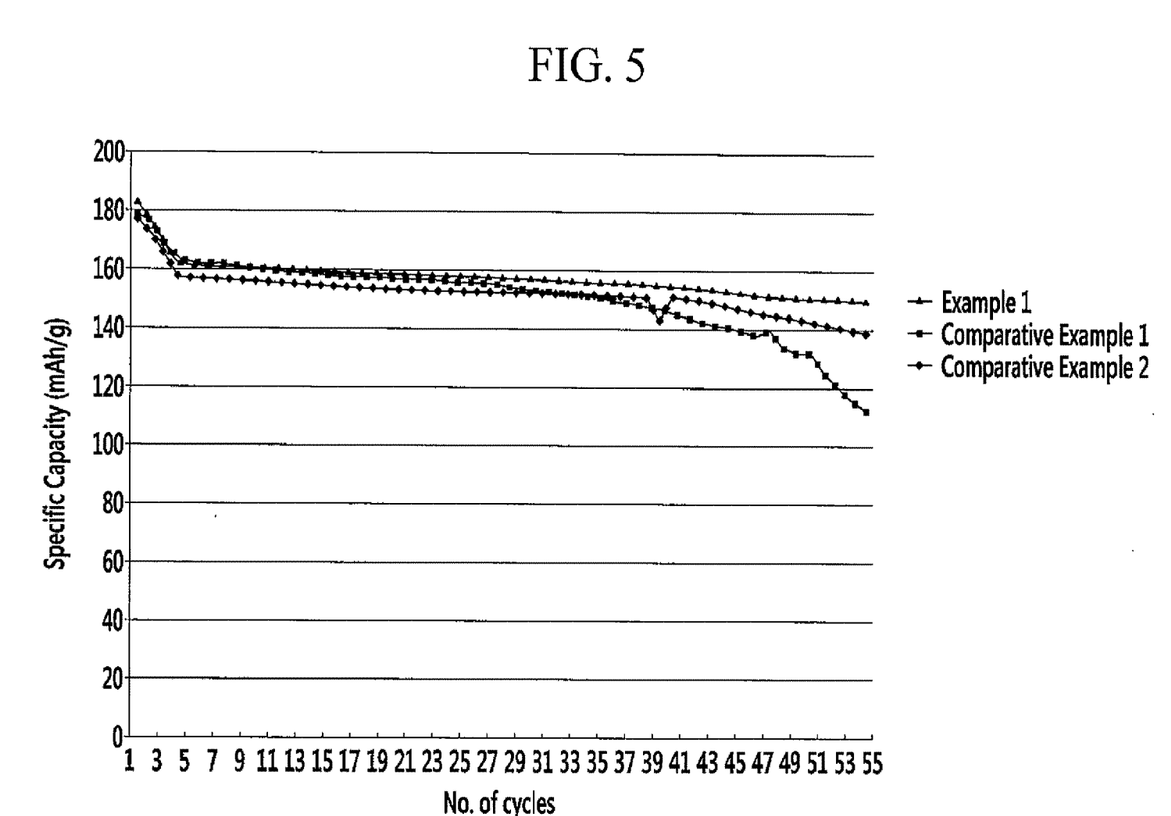
FIG. 5 is a graph comparing the cycle-life characteristics of the rechargeable lithium battery cells prepared according to Example 1 and Comparative Examples 1 and 2.

The cycle-life characteristics of each cell manufactured using the positive active materials prepared according to Example 1 and Comparative Examples 1 and 2 were measured according to the following method, and the results are shown in FIG. 5.

For the first cycle, each cell was charged and discharged at a current density of 0.1 C to a charging cut-off voltage of 4.3V, and a discharging cut-off voltage of 3.0V. For the second cycle, the current density was applied in the order of 0.2 C, 0.5 C and 1 C, the charging cut-off voltage was 4.3V, and the discharging cut-off voltage was 3.0V. Then, while continuously charging and discharging at 1 C, the cycle-life curve was observed.

FIG. 5 is a graph comparing the cycle-life characteristics of the cells prepared according to Example 1 and Comparative Examples 1 and 2. Referring to FIG. 5, it is confirmed that Example 1 (including a positive active material including the lithium composite metal oxide in which Zr was present in the position of Li) had better capacity and cycle-life characteristics as compared to Comparative Example 1 (in which Zr was not coated in the position of Li, but coated only in the metal position of Ni—Co—Mn) and Comparative Example 2 (in which Zr was not coated).

While certain embodiments have been illustrated and described, those of ordinary skill in the art would understand that various modification can be made to the described embodiments without departing from the spirit and scope of the present invention, as defined in the accompanying claims. Indeed, the invention is not limited to the disclosed embodiments, but, on the contrary, is intended to cover various modifications and equivalent arrangements.

What is claimed is:

1. A positive active material for a rechargeable lithium battery, comprising:
a lithium composite metal oxide represented by Chemical Formula 1:

$$Li_aZr_bNi_cCo_dM_eZr_fO_2 \quad \text{[Chemical Formula 1]}$$

wherein, a<1.1, 0<b≤0.1, 0≤c≤1, 0≤d≤1, 0≤e≤1, 0≤f≤0.1, 0.9≤a+b≤1.1, c+d+e+f=1, M is Mn or Al, and Zr is partially present in the position of at least Li in the lithium composite metal oxide.

2. The positive active material for a rechargeable lithium battery of claim 1, wherein a<1.1, 0<b≤0.05, 0≤c≤1, 0≤d≤1, 0≤e≤1, 0≤f≤0.05, 0.9≤a+b≤1.1, c+d+e+f=1.

3. The positive active material for a rechargeable lithium battery of claim 1, wherein the lithium composite metal oxide shows a peak at a 2θ value of about 19° to about 23° and a peak at a 2θ value of about 40° to about 45° in an XRD pattern using a CuKα ray.

4. The positive active material for a rechargeable lithium battery of claim 1, wherein the lithium composite metal oxide has an Li:Zr atomic ratio of about 90:10 to 99.9:0.1 when Zr is present at a Li position of the lithium composite metal oxide.

5. A rechargeable lithium battery, comprising
a positive electrode including the positive active material according to claim 1;
a negative electrode; and
an electrolyte.

6. A method of preparing a positive active material for a rechargeable lithium battery, the method comprising:
adding a lithium metal oxide represented by Chemical Formula 2 to a Zr salt-containing solution to obtain a mixed solution; and
heat-treating the mixed solution to prepare a lithium composite metal oxide represented by Chemical Formula 1

$$Li_aZr_bNi_cCo_dM_eZr_fO_2 \quad \text{[Chemical Formula 1]}$$

wherein, a<1.1, 0<b≤0.1, 0≤c≤1, 0≤d≤1, 0≤e≤1, 0≤f≤0.1, 0.9≤a+b≤1.1, c+d+e+f=1, M is Mn or Al, and Zr is partially present in the position of at least Li in the lithium composite metal oxide;

$$Li_aNi_gCo_hM_iO_2 \quad \text{[Chemical Formula 2]}$$

wherein, 0.9≤a≤1.1, 0≤g≤1, 0≤h≤1, 0≤i≤1, g+h+i=1, and M is Mn or Al.

7. The method of claim 6, wherein the Zr salt-containing solution is present in the mixed solution in an amount of about 0.1 to about 10 parts by mole based on 100 parts by mole of the lithium metal oxide.

8. The method of claim 6, wherein the Zr salt-containing solution is an aqueous solution or an alcohol solution.

9. The method of claim 6, wherein the Zr salt-containing solution is prepared by a method comprising:
adding a Zr salt to a first solvent to obtain a first solution;
adding citric acid to a second solvent to prepare a second solution;
mixing the first solution and the second solution to obtain a transparent solution; and
adding ethylene glycol to the transparent solution.

10. The method of claim 6, wherein the heat-treating the mixed solution is performed at a temperature of about 350° C. to about 1000° C.

11. The method of claim 6, further comprising drying the mixed solution to obtain a dried product, before heat-treating.

12. The method of claim 6, wherein the heat-treating is performed by
performing a first heat-treatment on the mixed solution to obtain a mixture; and
performing a second heat-treatment on the mixture.

13. The method of claim 12, wherein the first heat-treatment is performed at a temperature of about 80° C. to about 100° C.

14. The method of claim 12, wherein the second heat-treatment is performed at a temperature of about 350° C. to about 1000° C.

* * * * *

UNITED STATES PATENT AND TRADEMARK OFFICE
CERTIFICATE OF CORRECTION

PATENT NO. : 9,716,273 B2
APPLICATION NO. : 14/329857
DATED : July 25, 2017
INVENTOR(S) : Ming-Zi Hong et al.

It is certified that error appears in the above-identified patent and that said Letters Patent is hereby corrected as shown below:

In the Claims

Column 12, Claim 6, Line 21

Delete "$Li_aNi_gCo_nM_iO_2$"
Insert --$Li_aNi_gCo_hM_iO_2$--

Signed and Sealed this
Nineteenth Day of February, 2019

Andrei Iancu
*Director of the United States Patent and Trademark Office*